United States Patent
Umberger et al.

(10) Patent No.: US 7,213,165 B2
(45) Date of Patent: *May 1, 2007

(54) HOST I/O PERFORMANCE AND AVAILABILITY OF A STORAGE ARRAY DURING REBUILD BY PRIORITIZING I/O REQUESTS

(75) Inventors: David K. Umberger, Boise, ID (US); Rodger D. Daniels, Boise, ID (US); Mohamed Belhadj, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 547 days.

This patent is subject to a terminal disclaimer.

(21) Appl. No.: 10/667,949

(22) Filed: Sep. 22, 2003

(65) Prior Publication Data

US 2004/0059958 A1    Mar. 25, 2004

Related U.S. Application Data

(63) Continuation of application No. 09/534,921, filed on Mar. 23, 2000, now Pat. No. 6,647,514.

(51) Int. Cl.
*G06F 11/00* (2006.01)
(52) U.S. Cl. ............................................ 714/7; 714/42
(58) Field of Classification Search ............. 714/7, 714/42
See application file for complete search history.

(56) References Cited

U.S. PATENT DOCUMENTS

| | | | |
|---|---|---|---|
| 5,278,838 A | 1/1994 | Ng et al. | |
| 5,392,244 A | 2/1995 | Jacobson et al. | |
| 5,500,940 A | 3/1996 | Skeie | |
| 5,680,539 A | 10/1997 | Jones | |
| 5,822,584 A | 10/1998 | Thompson et al. | |
| 5,835,700 A | 11/1998 | Carbonneau et al. | |
| 5,881,311 A | 3/1999 | Woods | |
| 5,941,993 A | 8/1999 | Tanaka et al. | |
| 6,032,217 A | 2/2000 | Arnott | |
| 6,516,425 B1 | 2/2003 | Belhadj et al. | |
| 6,799,283 B1 * | 9/2004 | Tamai et al. | 714/6 |

OTHER PUBLICATIONS

Chen, et al.; RAID: High-Performance, REliable Secondary Storage, Jun. 1994, ACM Computing Suveys, vol. 26, pp. 141-184.

* cited by examiner

*Primary Examiner*—Michael C. Maskulinski

(57) ABSTRACT

Improved host I/O performance and availability of a storage array during rebuild is obtained by prioritizing I/O requests. In one embodiment, rebuild I/O requests are given priority over host I/O requests when the storage array is close to permanently losing data (for example, failure of one more particular disk in the storage array would result in data loss). Rebuild I/O requests continue to have priority over host I/O requests until the storage array is no longer close to permanently losing data, at which point host I/O requests are given priority over rebuild I/O requests.

20 Claims, 6 Drawing Sheets

HOST I/O PERFORMANCE AND AVAILABILITY OF A STORAGE ARRAY DURING REBUILD BY PRIORITIZING I/O REQUESTS

RELATED APPLICATIONS

This application is a continuation of application Ser. No. 09/534,921, filed Mar. 23, 2000, now U.S. Pat. No. 6,647,514 entitled "Improving Host I/O Performance and Availability of a Storage Array During Rebuild by Prioritizing I/O Requests", which is hereby incorporated by reference herein.

TECHNICAL FIELD

This invention relates to storage arrays. More particularly, the invention relates to prioritizing I/O requests to improve host I/O performance and availability of a storage array during rebuild.

BACKGROUND

Conventional disk array data storage systems have multiple storage disk drive devices that are arranged and coordinated to form a single mass storage system. The common design goals for mass storage systems include low cost per megabyte, high input/output performance, and high data availability. Data availability involves the ability to access data stored in the storage system while ensuring continued operation in the event of a disk or component failure. Data availability is often provided through the use of redundancy where data, or relationships among data, are stored in multiple locations in the storage system. In the event of disk failure, redundant data is retrieved from the operable portion of the system and used to regenerate the original data that is lost due to the component failure.

There are two common methods for storing redundant data on disk drives: mirrored and parity. In mirrored redundancy, the data being stored is duplicated and stored in two separate areas of the storage system that are the same size (an original data storage area and a redundant storage area). In parity redundancy, the original data is stored in an original data storage area and the redundant data is stored in a redundant storage area, but because the redundant data is only parity data the size of the redundant storage area is less than the size of the original data storage area.

RAID (Redundant Array of Independent Disks) storage systems are disk array systems in which part of the physical storage capacity is used to store redundant data. RAID systems are typically characterized as one of seven architectures or levels, enumerated under the acronym RAID. A RAID 0 architecture is a disk array system that is configured without any redundancy. Since this architecture is really not a redundant architecture, RAID 0 is often omitted from a discussion of RAID systems.

A RAID 1 architecture involves storage disks configured according to mirrored redundancy. Original data is stored on one set of disks and a duplicate copy of the data is kept on separate disks. The RAID 2 through RAID 6 architectures all involve parity-type redundant storage. Of particular interest, a RAID 5 architecture distributes data and parity information across all of the disks. Typically, the disks are divided into equally sized address areas referred to as "blocks". A set of blocks from each disk that has the same unit address ranges are referred to as "stripes". In RAID 5, each stripe has N blocks of data and one parity block which contains redundant information for the data in the N blocks.

In RAID 5, the parity block is cycled across different disks from stripe-to-stripe. For example, in a RAID 5 architecture having five disks, the parity block for the first stripe might be on the fifth disk; the parity block for the second stripe might be on the fourth disk; the parity block for the third stripe might be on the third disk; and so on. The parity block for succeeding stripes typically "precesses" around the disk drives in a helical pattern (although other patterns are possible). RAID 2 through RAID 4 architectures differ from RAID 5 in how they place the parity block on the disks.

A RAID 6 architecture is similar to RAID 4 and 5 in that data is striped, but is dissimilar in that it utilizes two independent and distinct parity values for the original data, referred to herein as P and Q. The P parity is commonly calculated using a bit by bit Exclusive OR function of corresponding data chunks in a stripe from all of the original data disks. This corresponds to a one equation, one unknown, sum of products calculation. On the other hand, the Q parity is calculated linearly independent of P and using a different algorithm for sum of products calculation. As a result, each parity value is calculated using an independent algorithm and each is stored on a separate disk. Consequently, a RAID 6 system can rebuild data (assuming rebuild space is available) even in the event of a failure of two separate disks in the stripe, whereas a RAID 5 system can rebuild data only in the event of no more than a single disk failure in the stripe.

Similar to RAID 5, a RAID 6 architecture distributes the two parity blocks across all of the data storage devices in the stripe. Thus, in a stripe of N+2 data storage devices, each stripe has N blocks of original data and two blocks of independent parity data. One of the blocks of parity data is stored in one of the N+2 data storage devices, and the other of the blocks of parity data is stored in another of the N+2 data storage devices. Similar to RAID 5, the parity blocks in RAID 6 are cycled across different disks from stripe-to-stripe. For example, in a RAID 6 system using five data storage devices in a given stripe, the parity blocks for the first stripe of blocks may be written to the fourth and fifth devices; the parity blocks for the second stripe of blocks may be written to the third and fourth devices; the parity blocks for the third stripe of blocks may be written to the second and third devices; etc. Typically, again, the location of the parity blocks for succeeding blocks shifts to the succeeding logical device in the stripe, although other patterns may be used.

A hierarchical data storage system permits data to be stored according to different techniques. In a hierarchical RAID system, data can be stored according to multiple RAID architectures, such as RAID 1 and RAID 5, to afford tradeoffs between the advantages and disadvantages of the redundancy techniques.

Additionally, a data storage system may permit data to be stored in multiple redundancy groups co-existing within the system. In a RAID system, each redundancy group is a set of disks in the RAID system that use the same RAID architecture (or RAID architectures for a hierarchical RAID system) to provide redundancy. By way of example, in a RAID system having a total of thirty disks, ten disks may be in a first redundancy group using one RAID architecture(s) (e.g., using RAID 1), another twelve disks may be in a second redundancy group using a second RAID architecture(s) (e.g., using RAID 1 and RAID 5), and the remaining eight disks may be in a third redundancy group using a third RAID architecture(s) (e.g., using RAID 1 and RAID 6).

U.S. Pat. No. 5,392,244 to Jacobson et al., entitled "Memory Systems with Data Storage Redundancy Management", describes a hierarchical RAID system that enables data to be migrated from one RAID type to another RAID type as data storage conditions and space demands change. This patent, which is assigned to Hewlett-Packard Company, describes a multi-level RAID architecture in which physical storage space is mapped into a RAID-level virtual storage space having mirrored and parity RAID areas (e.g., RAID 1 and RAID 5). The RAID-level virtual storage space is then mapped into an application-level virtual storage space, which presents the storage space to the user as one large contiguously addressable space. During operation, as user storage demands change at the application-level virtual space, data can be migrated between the mirrored and parity RAID areas at the RAID-level virtual space to accommodate the changes. For instance, data once stored according to mirrored redundancy may be shifted and stored using parity redundancy, or vice versa. The U.S. Pat. No. 5,392,244 patent is hereby incorporated by reference to provide additional background information.

In the event that a disk in a RAID system fails the data in the array is "rebuilt", a process which typically involves issuing multiple read and/or write requests to the disk array. Typically, the RAID system is also available for read and write requests from a host computer during this rebuilding process. Unfortunately, these host requests often require access to the same resources as are used by the rebuild requests, and therefore compete with the rebuild requests.

In some systems, such competition between host requests and rebuild requests are resolved by either always delaying the host requests in favor of the rebuild requests (which can result in situations where the data in the storage array is rebuilt more quickly and the performance of the system in responding to host requests is diminished even though the storage array is not close to permanently losing data) or always delaying the rebuild requests in favor of the host requests (which can result in situations where the performance of the system in responding to host requests is not diminished, but rebuilding data in the storage array can take a very long time even though the storage array is close to permanently losing data). A storage array is close to permanently losing data when, for example, failure of one more particular disk in the storage array would result in data loss.

The improvement of host I/O performance and availability of a storage array during rebuild by prioritizing I/O requests described below addresses these and other disadvantages.

SUMMARY

Improving host I/O performance and availability of a storage array during rebuild by prioritizing I/O requests is described herein.

According to one aspect, rebuild I/O requests are given priority over host I/O requests when the storage array is close to permanently losing data (for example, failure of one more particular disk in the storage array would result in data loss). Rebuild I/O requests continue to have priority over host I/O requests until the storage array is no longer close to permanently losing data, at which point host I/O requests are given priority over rebuild I/O requests.

According to another aspect, host I/O requests and rebuild I/O requests are both input to a queue to await processing. When rebuild I/O requests are to have priority (e.g., in a "rebuild priority" mode), new I/O requests (whether host or rebuild) are input to the bottom of the queue and propagate to the top of the queue, where they are processed in a first-in-first-out (FIFO) manner. However, when host I/O requests are to have priority (e.g., in a "host priority" mode"), new rebuild I/O requests are input to the bottom of the queue and new host I/O requests are inserted into the queue below any other host I/O requests but above any rebuild I/O requests. This has the effect of allowing host I/O requests to be processed before rebuild I/O requests when in the host priority mode, but allowing host I/O and rebuild I/O requests to be processed in the order they are received when in the rebuild priority mode (which results in allocation of more system resources to rebuild I/O requests than host I/O requests).

According to another aspect, allocation of one or more system resources to host I/O requests is restricted when rebuild I/O requests are to have priority over host I/O requests. In this case, I/O requests (whether host or rebuild) are processed in the order they are received so long as the system resource(s) usage by host I/O requests has not exceed a threshold amount. If the threshold amount is exceeded, then rebuild I/O requests are processed before host I/O requests.

According to another aspect, processing of I/O requests (whether host or rebuild) occurs in multiple phases. The processing of a particular request can be preempted between two phases in favor of a higher priority I/O request. By way of example, if a new rebuild I/O request is received while in a rebuild priority mode then processing of a host I/O request can be preempted, allowing the rebuild I/O request to be processed.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
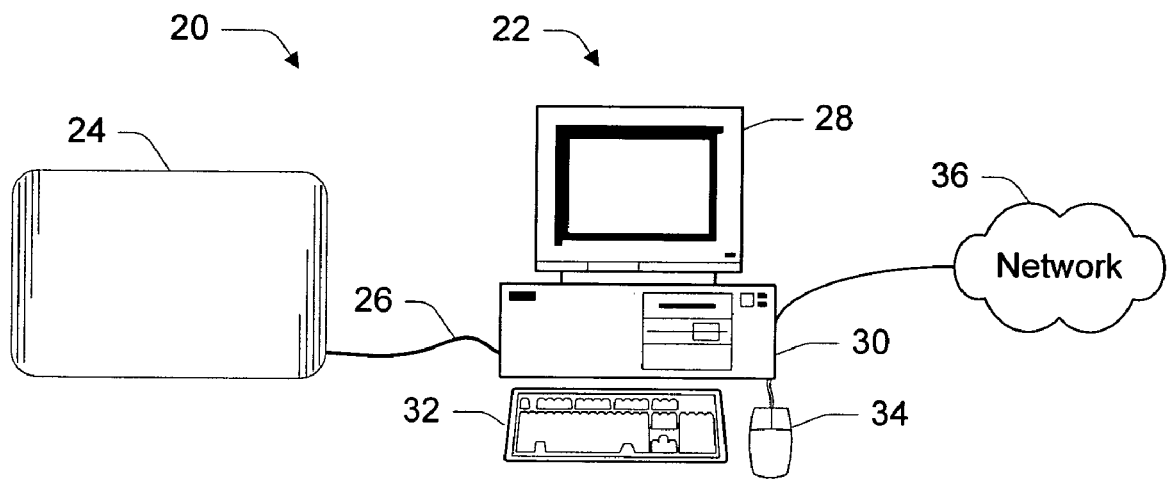
FIG. 1 is a block diagram illustrating an exemplary computer system having a host computer connected to a data storage system.

FIG. 1 shows a computer system 20 having a host computer 22 connected to a data storage system 24 via an input/output (I/O) interface bus 26. Host computer 22 is a general purpose computer that can be configured, for example, as a server or workstation. Computer 22 has a visual display device 28, a central processing unit (CPU) 30, a keyboard 32, and a mouse 34. Other data entry and output peripherals may also be included, such as a printer, tape drive, CD-ROM drive, network interfaces, and so forth. In FIG. 1, host computer 22 is coupled to a network 36 to serve data from the data storage system 24 to one or more clients (not shown).

Data storage system 24 represents a storage array configured to hold user data and other information. In one implementation, data storage system 24 is a hierarchical redundant array of independent disks (RAID) system that is capable of storing data according to different and/or multiple redundancy schemes. Host computer 22 provides an interface for an administrator or other user to manage the RAID storage system, such as to run diagnostics, evaluate performance, set operating parameters, etc. For ease of explanation, data storage system 24 is described herein as a RAID system, although other types of storage arrays could alternatively be used.

Figure 2:
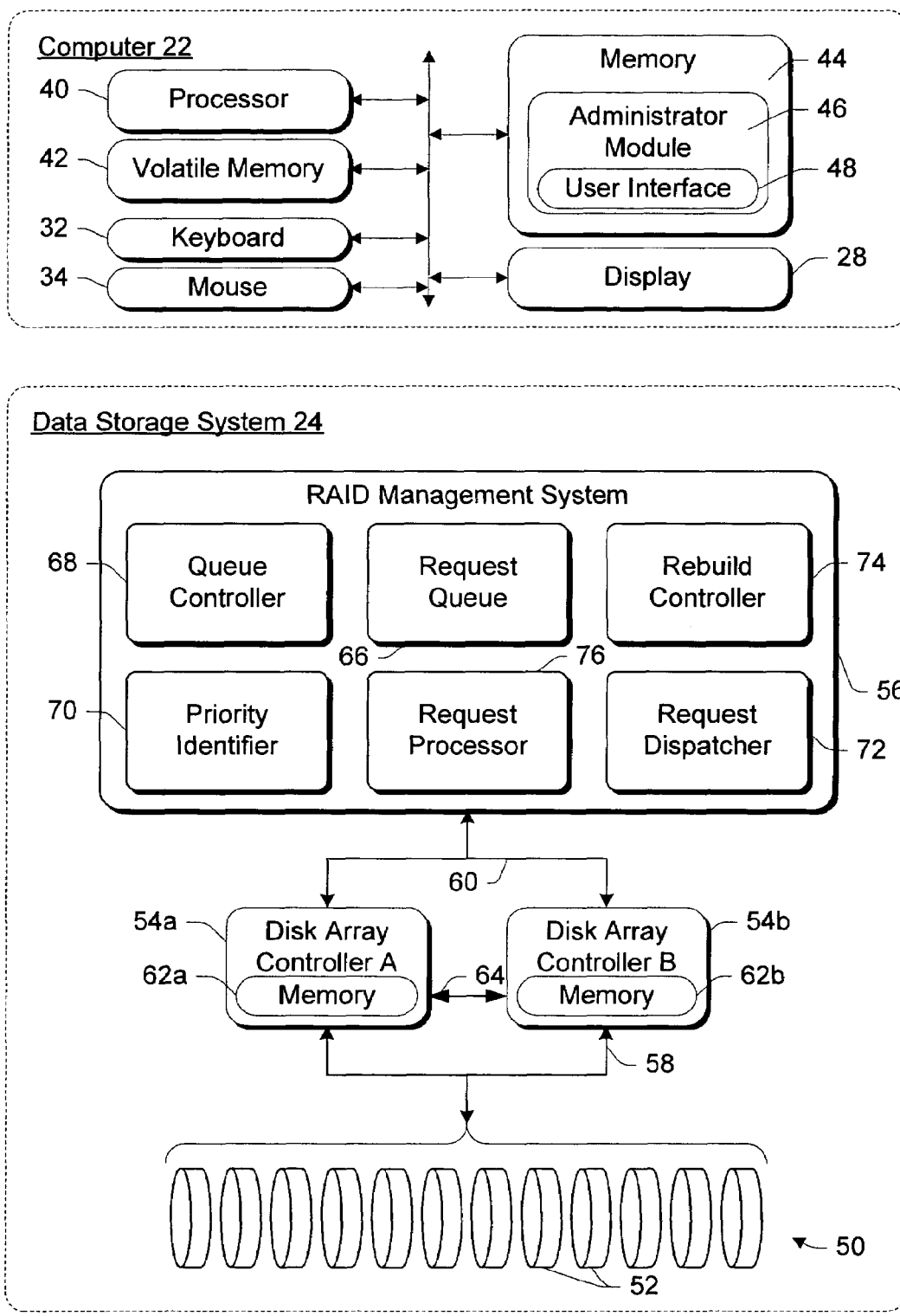
FIG. 2 is a block diagram illustrating an exemplary host computer and an exemplary data storage system in more detail.

FIG. 2 shows host computer 22 and data storage system 24 in more detail. The computer 22 has a processor 40, a volatile memory 42 (i.e., RAM), a keyboard 32, a mouse 34, a non-volatile memory 44 (e.g., ROM, hard disk, floppy disk, CD-ROM, DVD, etc.), and a display 28. An administrator module 46 is stored in memory 44 and executes on processor 40. Administrator module 46 can set various parameters of data storage system 24 and also provides management functions such as diagnostics, performance review, capacity analysis, etc. Administrator module 46 supports a storage manager user interface (UI) 48 that presents a visual interface on the display 28. An administrator, via UI 48, can alter various parameters in data storage system 24 to control the priority given to host I/O requests versus rebuild I/O requests, as discussed in more detail below.

Data storage system 24 includes a disk array 50 with multiple storage disks 52, disk array controllers 54a and 54b, and a RAID management system 56. As used herein, a "disk" refers to any mass storage device, typically a non-volatile, randomly accessible, and rewriteable mass storage device. Examples of disks include magnetic disks and optical disks, as well as non-volatile electronic storage elements (e.g., PROMs, EPROMs, EEPROMs, etc.).

The disk array controllers 54a and 54b are coupled to the disk array 50 via one or more interface buses 58, such as a small computer system interface (SCSI). The RAID management system 56 is coupled to the disk array controllers 54a and 54b via an interface protocol 60. It is noted that the RAID management system 56 can be embodied in software, firmware, hardware, or a combination thereof, and can be embodied as a separate component (as shown), or within the disk array controllers 54a and 54b, or within the host computer 22. In one implementation, RAID management system 56 is a software module that runs on a processing unit of data storage system 24, or on processor 40 of computer 22. Alternatively, RAID management system 56 may be executed by another processing unit, be embodied in firmware, or be embodied in hardware (e.g., an ASIC).

Disk array controllers 54a and 54b coordinate data transfers to and from the disk array 50. One or more redundancy groups can be implemented on disk array 50 and one or more RAID architecture levels can be implemented in each redundancy group. In FIG. 2, disk array controllers 54a and 54b are identical controller boards. The parallel controllers enhance reliability by providing continuous backup and redundancy in the event that one controller becomes inoperable. The parallel controllers 54a and 54b have respective mirrored memories 62a and 62b through link 64. In one implementation, the mirrored memories 62a and 62b are battery-backed, non-volatile RAMs (NVRAMs), although other types of memories could alternatively be used. The mirrored memories 62a and 62b store several types of information, such as a memory map of the storage space in disk array 50, a read cache for data being read from disk array 50, a write cache for data before it is written to disk array 50, etc. Although dual controllers 54a and 54b are illustrated in FIG. 2, different configurations can be used such as multi-controller configurations where more than two controllers are employed, or alternatively single-controller configurations.

RAID management system 56 includes a request queue 66, a queue controller 68, a priority identifier 70, a request dispatcher 72, a rebuild controller 74, and a request processor 76. Rebuild controller 74 manages the rebuilding of data in any of the one or more RAID architecture levels maintained by disk array 50 in the event that one or more of disks 52 fails. Failure of a disk 52 refers to all or a portion of a disk 52 becoming inaccessible, due to a problem with the disk itself or a component used in accessing the disk (e.g., a bus). The detection of disk failures is well known to those skilled in the art and thus will not be discussed further except as it pertains to the invention.

Due to the different RAID levels that may possibly be stored on disk array 50, failures of different disks can result in different RAID levels being rebuilt. The manner in which the data in the storage array is rebuilt can vary depending on numerous factors, such as the nature of the failure, the RAID levels employed in the array, the number of disks in the redundancy group, etc. Examples of rebuilding data in an array include migrating data to other disks and/or RAID levels so that a failed disk is not used, copying data to (or determining what data to write and writing that data to) a newly installed disk, writing data to a designated backup or spare disk. Nonetheless, rebuilding of a RAID level typically involves the reading of data from and/or the writing of data to disk array 50. Additionally, the rebuilding process may be performed automatically in response to detecting the failure, or alternatively may be performed in response to a user (or administrator) request. The rebuilding of RAID levels is well known to those skilled in the art and thus will not be discussed further except as it pertains to the invention.

Request queue 66 is illustrated in FIG. 2 and discussed herein as being a logical queue structure (an abstraction of the actual queue mechanism implementation). Request queue 66 can be implemented in any of a wide variety of manners. Examples of such implementations include: a single queue may be used into which all I/O requests (whether host or rebuild) are placed; multiple queues may be used and I/O requests placed in one queue while rebuild requests are placed in another queue, or alternatively requests of different priorities may be placed into different queues; a simple list may be maintained of the requests and time of receipt of each request (and optionally priority of each request); etc.

Request queue 66 stores I/O requests targeting disk array 50 and to be processed by controllers 54a and 54b. These I/O requests can originate with host computer 22 or alternatively rebuild controller 74, and can be input and/or output requests (e.g., read requests, write requests, etc.). In the illustrated example, requests are input to request queue 66 by queue controller 68, although alternatively requests could be input to request queue 66 directly by host computer 22 or rebuild controller 74. Requests can be input to request queue 66 in different manners, such as in the order they are received or according to some other ordering as discussed in more detail below.

Requests are retrieved from request queue 66 by request dispatcher 72 and forwarded to request processor 76 for processing. Processing of a request varies based on the type of request, but generally refers to performing any of the actions necessary to carry out the request. These actions may include, for example, calculating parity values, writing data to one or more disks, reading data from one or more disks, etc. Request dispatcher 72 can retrieve requests from request queue 66 in the order they were placed in the queue, or alternatively according to some other ordering as discussed in more detail below.

Priority identifier 70 determines whether host I/O requests or rebuild I/O requests should have priority over the other. The behavior of queue controller 68 and/or request dispatcher 72 may change based on whether host I/O requests or rebuild I/O requests should have priority over the other, as discussed in more detail below.

Generally, request queue 66, queue controller 68, priority identifier 70, and request dispatcher 72 operate together to give host I/O requests or rebuild I/O requests priority over each other. Whether host or rebuild requests have priority at any particular time is dependent on how close the array 50 is to permanently losing data. Giving priority to one type of request over the other can be on a request basis (e.g., all of the priority requests will be submitted to array controllers 54a and 54b for processing before any of the other requests) or alternatively on a resource basis (e.g., the requests without priority will be more limited in their resource usage than requests with priority), as discussed in more detail below.

Figure 3:
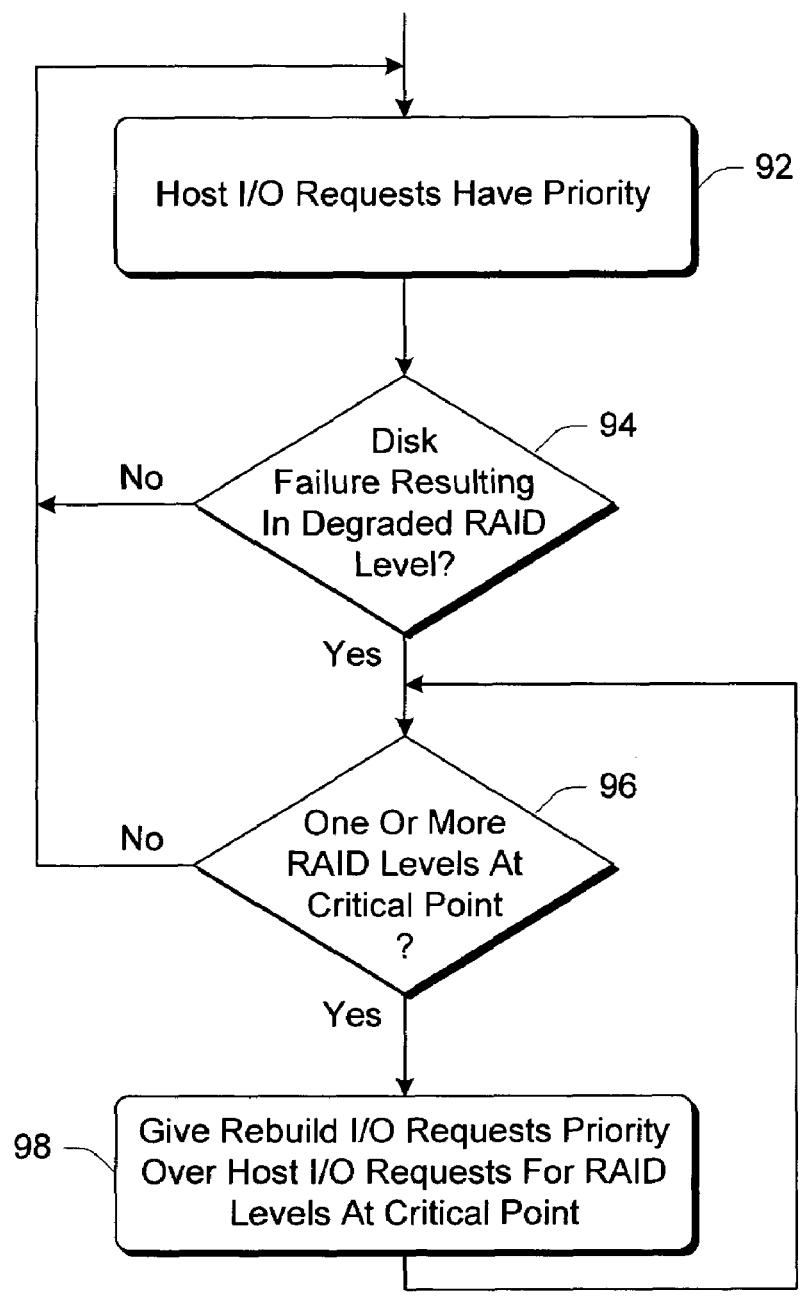
FIG. 3 is a flowchart illustrating an exemplary process for managing host I/O requests and rebuild I/O requests.

FIG. 3 is a flowchart illustrating an exemplary process for managing host I/O requests and rebuild I/O requests. The process of FIG. 3 is implemented by RAID management system 56 of FIG. 2, and is described with additional reference to elements of FIG. 2.

Initially, when there are no disk failures in data storage system 24, host I/O requests have priority (referred to as "host priority") (act 92). Host I/O requests continue to have priority until a disk failure resulting in a degraded RAID level occurs (act 94). A degraded RAID level refers to a RAID level in which one or more disks have failed. If a disk that is storing data for one or more RAID levels fails, then the disk failure results in a degraded RAID level. However, not all disk failures will result in a degraded RAID level (e.g., the disk may be a spare disk and thus not have any data stored on it, the disk array may be new and not initialized yet for RAID levels, the failed disk may be in another redundancy group, etc.).

When a disk failure resulting in a degraded RAID level occurs, priority identifier 70 checks whether there are one or more RAID levels at a critical point (act 96). A critical point refers to a situation where a RAID level is close to permanently losing data. Permanently losing data refers to losing data and being unable to recover the lost data. Permanently losing data is different from simply losing data (e.g., due to a disk failure), as the very nature of the RAID storage system is to provide redundancy so that some disk failures can occur and data on those disks recovered by rebuilding without permanently losing data.

In one implementation, a RAID level is identified as being close to permanently losing data when the failure of one (or one more) disk would result in permanent loss of at least some data in that RAID level. The number of failures that a particular RAID architecture level can endure without data loss varies, so it is possible in a hierarchical data storage system to have some RAID levels that would be close to permanently losing data as soon as one disk in the redundancy group fails (e.g., RAID 1 or RAID 5), but that other RAID levels would not be close to permanently losing data until an additional disk(s) in the redundancy group fails (e.g., RAID 6).

In the illustrated example, priority identifier 70 is programmed with which disks 52 of array 50 are being used for which RAID levels and which redundancy groups, as well as how many of the disks in each RAID level can fail before a data loss results. When a disk 52 fails, priority identifier 70 is notified of which disk(s) failed (e.g., either directly or via rebuild controller 74). Similarly, when the system has completed rebuilding data as a result of a failed disk, priority identifier 70 is similarly notified (e.g., by rebuild controller 74). Priority identifier 70 is thus able to accurately determine which redundancy groups and RAID levels within each redundancy group, if any, are at critical points.

If priority identifier 70 determines that no RAID levels are at their critical points as a result of the disk failure, then host I/O requests continue to be given priority (act 92). Thus, in such situations, host I/O requests are processed in the order they are received and rebuild I/O requests are processed when there are available resources not being consumed by host I/O requests.

Returning to act 96, if one or more RAID levels are at their critical points, then rebuild I/O requests for those RAID levels are given priority over host I/O requests, referred to as "rebuild priority" for those RAID levels (act 98). When at rebuild priority, rebuild I/O requests are given preferential treatment (e.g., processed first, allocated more resources, etc.) than host I/O requests. This priority, for each RAID level at its critical point, continues for as long as that RAID level is at its critical point (act 96), at which point host I/O requests have priority over rebuild I/O requests for that RAID level. For example, if a redundancy group includes RAID 1 data and RAID 6 data and one disk in the redundancy group fails, then RAID 1 for that redundancy group would be at its critical point but RAID 6 would not, so RAID 1 would be at rebuild priority but RAID 6 would still be at host priority. By giving rebuild I/O requests priority over host I/O requests when a RAID level is at its critical point, data from that RAID level can be rebuilt more quickly to help protect against the possibility of permanent data loss.

Alternatively, in act 98 if at least one RAID level is at a critical point then that RAID level and at least one other RAID level (in one implementation, all RAID levels) have rebuild I/O requests given priority over host I/O requests. For example, if a redundancy group includes RAID 1 data and RAID 6 data and one disk in the redundancy group fails, then RAID 1 for that redundancy group would be at its critical point so both RAID 1 and RAID 6 in that redundancy group would be at rebuild priority (even though RAID 6 is not at its critical point). In this case, the whole redundancy group is at rebuild priority.

Additionally, in act 98, rebuild I/O requests for RAID levels at their critical points are given priority over host I/O requests for all redundancy groups (even if none of the RAID levels in a particular redundancy group are at their critical points). Alternatively, rebuild I/O requests for RAID levels at their critical points may be given priority over only host I/O requests in the same redundancy group(s) as the RAID levels at their critical points (other redundancy groups with no RAID levels at their critical points remain at host priority).

Figure 4:
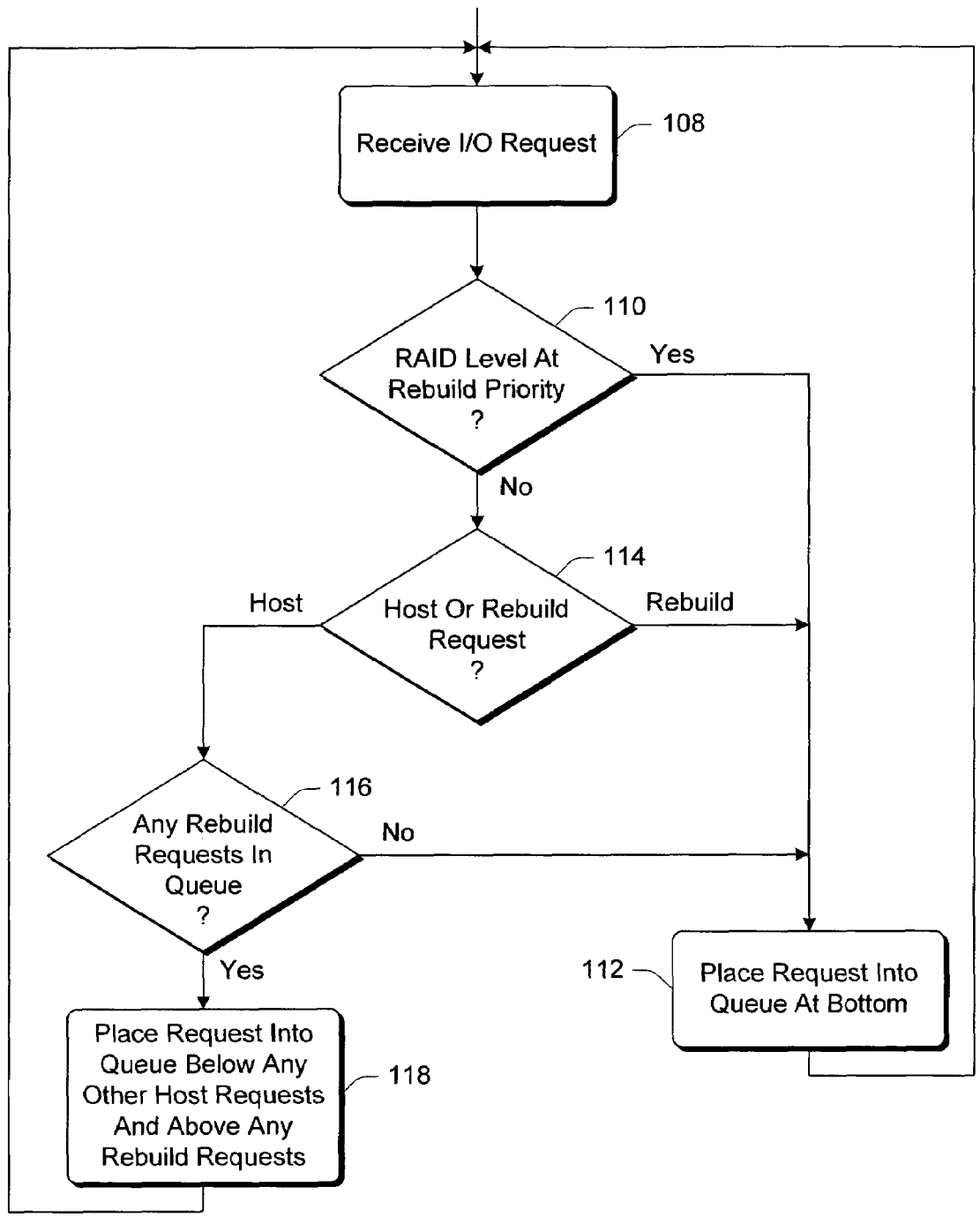
FIG. 4 is a flowchart illustrating an exemplary process for managing a request queue based on whether host I/O requests or rebuild I/O requests have priority.

FIG. 4 is a flowchart illustrating an exemplary process for managing a request queue based on whether host I/O requests or rebuild I/O requests have priority. The process of FIG. 4 is implemented by RAID management system 56 of FIG. 2, and is described with additional reference to elements of FIG. 2.

In the process of FIG. 4, requests are placed in a location of request queue 66 based on priority. If the RAID level is at rebuild priority then requests are placed into request queue 66 in the order they are received and processed in a first-in-first-out (FIFO) manner. Although this can result in host I/O requests being removed from request queue 66 and processed before some rebuild I/O requests are removed and processed, the result is that rebuild I/O requests have priority because they typically consume more system resources during processing than host I/O requests.

Initially, an I/O request (either host or rebuild) is received (act 108) and queue controller 68 checks (e.g., by querying priority identifier 70) whether the RAID level (or alternatively the redundancy group or the entire disk array) that the request corresponds to is at a rebuild priority (act 110). If the RAID level is at rebuild priority, then queue controller 68 places the received request into the bottom of request queue 66 (act 112), regardless of whether the request is a host I/O request or a rebuild I/O request. Processing then returns to act 108 for receipt of another I/O request (either host or rebuild).

On the other hand, if the RAID level is at host priority, then queue controller 68 checks whether the request is a host I/O request or a rebuild I/O request (act 114). If the request is a rebuild I/O request, then controller 68 places the request into the bottom of request queue 66 (act 112). If, however, the request is a host request then queue controller 68 checks whether there are any rebuild requests in request queue 66 (act 116). If there are no rebuild requests in request queue 66, then controller 68 places the request into the bottom of request queue 66 (act 112). On the other hand, if there are rebuild requests in request queue 66, then controller 68 places the request into the queue below any other host requests but above any rebuild requests (118). Processing then returns to act 108 for receipt of another I/O request.

The process of FIG. 4 allows request dispatcher 72 to always remove I/O requests form the top of request queue 66, as queue controller 68 is responsible for ordering the requests in request queue 66. Alternatively, the same result can be obtained by having controller 68 place requests in request queue 66 in the order they are received and having dispatcher 72 alter the order in which requests are removed from request queue 66 for processing (for example, if at host priority, search request queue 66 for host I/O requests and select a host I/O request (e.g., in a FIFO manner) for processing before selecting any rebuild I/O requests for processing).

Figure 5:
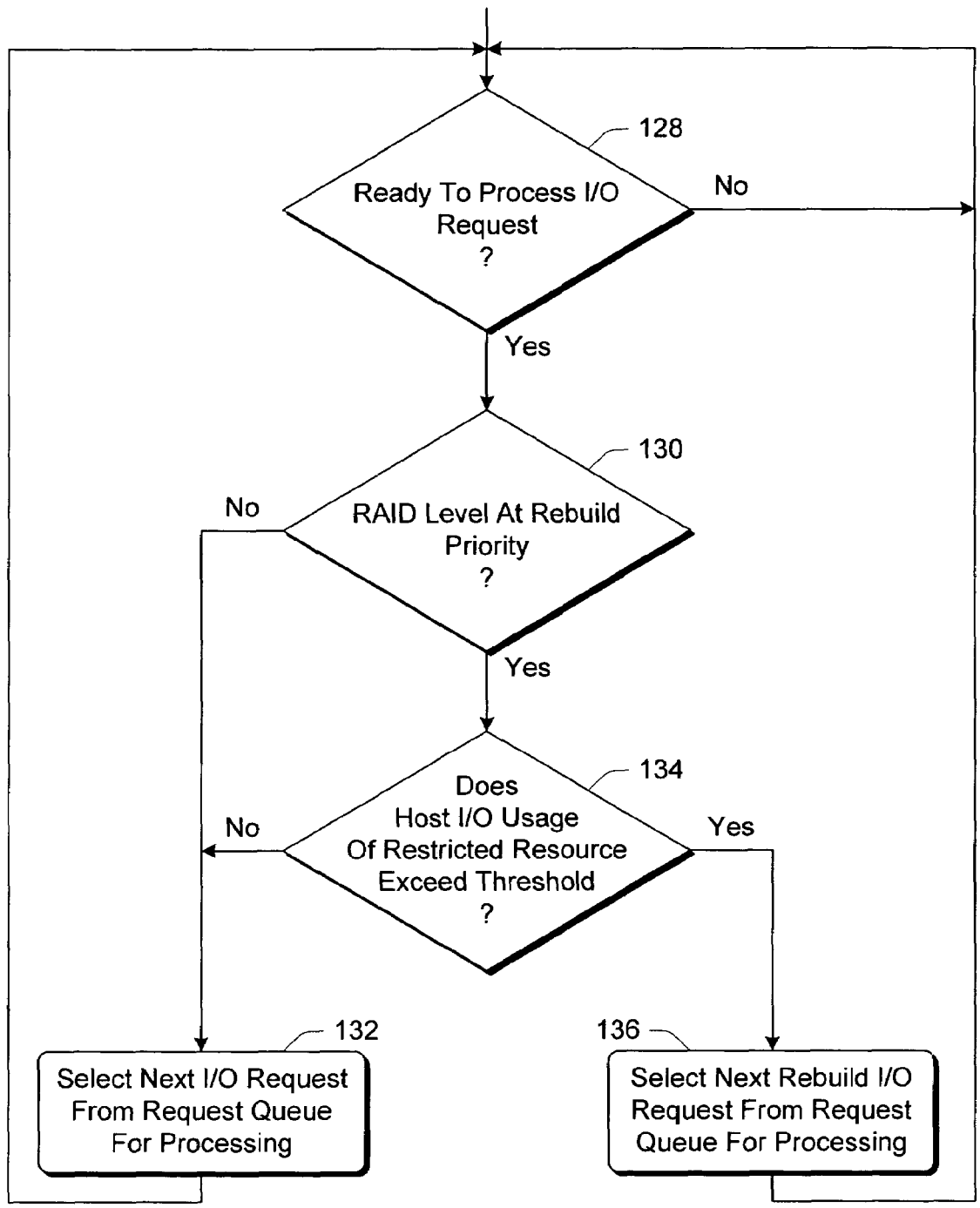
FIG. 5 is a flowchart illustrating an alternative process for managing a request queue based on whether host I/O requests or rebuild I/O requests have priority.

FIG. 5 is a flowchart illustrating an alternative process for managing a request queue based on whether host I/O requests or rebuild I/O requests have priority. The process of FIG. 5 is implemented by RAID management system 56 of FIG. 2, and is described with additional reference to elements of FIG. 2.

In the example of FIG. 5, queue controller 68 places requests into request queue 66 in the order they are received. Request dispatcher 72 then selects requests from request queue 66 for processing in a manner that ensures rebuild I/O usage of a restricted resource(s) when at rebuild priority. If the host I/O usage of a restricted resource(s) exceeds a threshold amount when at rebuild priority, then rebuild requests will be processed before host requests until that threshold amount is no longer exceeded. This results in allowing rebuild I/O requests to receive full usage of the restricted resource(s) if there are no host I/O requests in request queue 66, while at the same time preventing rebuild I/O usage of the restricted resource(s) from falling below a particular amount (i.e., a lower bound) if there are host I/O requests in request queue 66. By so ensuring an amount of rebuild I/O usage of a restricted resource(s), some host I/O requests will be processed when the RAID level is at rebuild priority but rebuild I/O requests are prevented from being starved out.

Although FIG. 5 is illustrated with reference to limiting host I/O usage of a restricted resource(s), RAID management system 56 may alternatively limit rebuild I/O usage of a restricted resource(s) in an analogous manner. In such an implementation, if the rebuild I/O usage of a restricted resource(s) exceeds a threshold amount when at host priority, then host requests will be processed before rebuild requests until that threshold amount is no longer exceed.

Referring to FIG. 2, storage system 24 can be implemented using any of a variety of resources. Examples of such resources include memories, CPUs, buses, etc. Restrictions can be placed on any of these resources in system 24. In one implementation, restrictions are placed on resources that are deemed to be "bottlenecks", such as a CPU(s) in the disk array controllers 54a and 54b, or a bus (or other channel) between controllers 54a and 54b and disk(s) 52.

Returning to FIG. 5, request dispatcher 72 waits until disk array controllers 54a and 54b are able to process another I/O request (act 128). Once ready, request dispatcher 72 checks whether the RAID level (or alternatively the redundancy group or the entire disk array) corresponding to the next I/O request in request queue 66 is at rebuild priority (act 130). The RAID level for requests in request queue 66 can be stored along with the requests in request queue 66, or alternatively request dispatcher 72 can determine the corresponding RAID level (e.g., request dispatcher 72 may be programmed with, or otherwise have access to, a mapping of addresses to RAID levels).

If the RAID level corresponding to the next request in request queue 66 is not at rebuild priority, then that next request is selected from request queue 66 for processing (act 132). However, if the RAID level is at rebuild priority, then request dispatcher 72 checks whether host I/O usage of a restricted resource(s) for that RAID level exceeds a threshold (act 134). If host I/O usage of the restricted resource(s) does not exceed the threshold, then that next request in request queue 66 is selected from request queue 66 for processing (act 132). If, however, host I/O usage of the restricted resource(s) does exceed the threshold, then the next rebuild I/O request for that RAID level is selected from request queue 66 for processing (act 136).

Alternatively, dispatcher 72 may not concern itself with distinguishing between different RAID levels in act 130. For example, if any RAID level were determined to be at rebuild priority then the determination can be made as to whether the host I/O usage for any RAID level (or all RAID levels combined) exceeds the threshold in act 134.

The determination of which resources are restricted, as well as what corresponding thresholds are to be exceeded to change between host priority and rebuild priority, can be made in a variety of manners. RAID management system 56 of FIG. 2 can be pre-configured with an identification of which system resources are to be restricted and their corresponding threshold values. Such resource restrictions may be modified by, or alternatively initially input by, an administrator or other user. Such input can be received, for example, via user interface 48 of FIG. 2. By way of example, a user may be presented with identifiers of the various resources in RAID management system and be allowed to select which of those resources are to be restricted. Additionally, specific threshold values can be input (e.g., by the user indicating that not greater than 25% of a particular resource should be used by host I/O requests when in rebuild priority). Alternatively, multiple presets may be given that correspond to particular values (e.g., a user may be able to select a "low", "medium", or "high" restriction, each of which can be converted to a particular value by administrator module 46 or RAID management system 56, such as 25%, 50%, and 75%, respectively).

FIGS. 2–5 are described with reference to a data storage system 24 having a single request queue 66, queue controller 68, priority identifier 70, and request dispatcher 72 for all RAID levels and redundancy groups being supported by storage system 24. Alternatively, each redundancy group may have its own request queue 66, controller 68, identifier 70, and dispatcher 72, and/or each RAID level (or other combination of RAID levels) may have its own request queue 66, controller 68, identifier 70, and dispatcher 72.

Additionally, the RAID management system can give priority to rebuild I/O requests and/or host I/O requests during the processing of requests. Processing of an I/O request typically occurs in multiple phases with various delays between these phases. For example, request processor 76 of FIG. 2 may need to read data from one or more disks 52 in order to process one request. However, due to delays in actually reading data from a disk(s) 52, there is often a period of time when request processor 76 is simply waiting for data to be received from the disks. During this period of time, an additional request(s) can be received from request dispatcher 72 and preempt the previous request, resulting in request processor 76 beginning (and possibly completing) processing of the new request.

Figure 6:
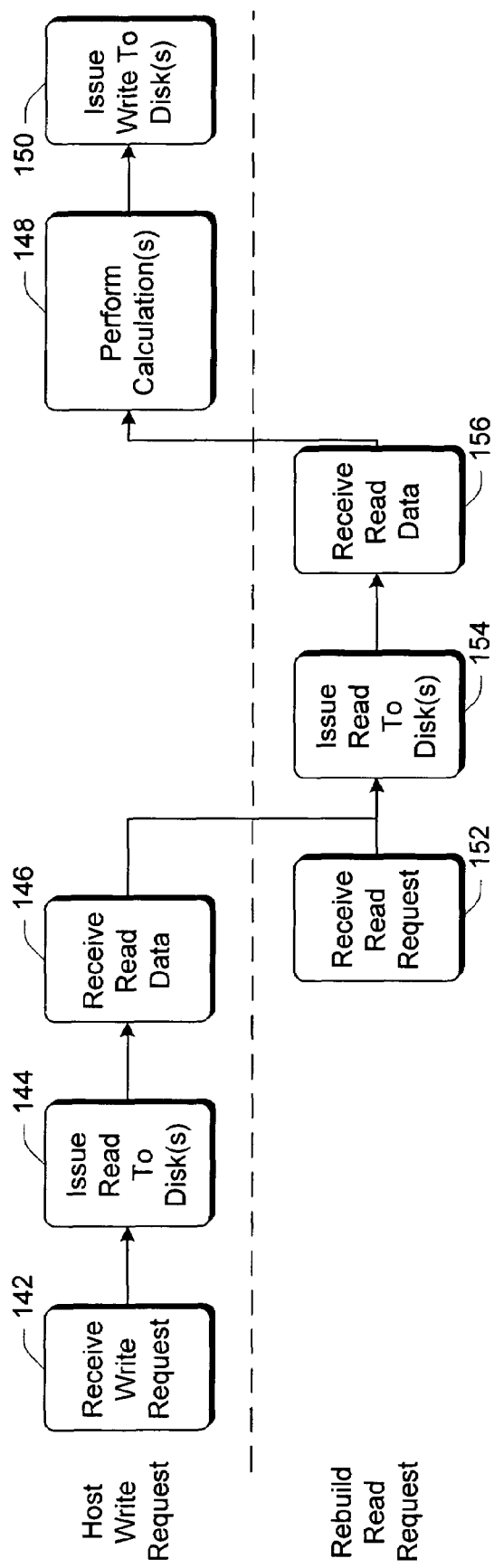
FIG. 6 is a flow diagram illustrating an example of preemption of an I/O request.

FIG. 6 is a flow diagram illustrating an example of preemption of an I/O request. FIG. 6 illustrates a write request as an exemplary request, although similar phases occur for other types of I/O requests.

Initially, the host write request is received (block 142). Based on the host write request, a read command(s) is issued to one or more of the disks 52 of FIG. 2 (block 144). After a period of time, the requested data is received from the disk(s) (block 146). Various calculations, such as parity calculations, are then performed (block 148). The manner in which such calculations are performed can vary depending on the RAID level(s) involved in the request. Once such calculations are completed, a write command(s) with the data corresponding to the host write request is issued to one or more of the disks 52.

However, in the example of FIG. 6, a rebuild read request is received (block 152) while the read data is being received from the disk(s) 52 (block 146). Request processor 76 preempts the host write request in favor of the rebuild read request after the data is received (block 146), and issues the rebuild read request to one or more of the disks 52 (block 154). After a period of time, the requested data is received from the disk(s) (block 156), and is returned to the requestor. As this completes the processing of the rebuild read request, the preempted host write request can resume, with request processor 76 performing the necessary calculations (block 148) and issuing a write command(s) to the disk(s) (block 150).

Alternatively, rather than completely preempting the host write request, preference may simply be given to the rebuild read request in situations where either the host write request or the rebuild read request can be processed. For example, after the read command(s) for the rebuild read request are issued to the disk(s) (block 154), request processor 76 can perform the various parity calculations (block 148) while waiting for the requested data for the rebuild read request to be received from the disk(s), thereby reducing the amount of time request processor 76 is idle.

Request processor 76 may optionally check whether the preempted host I/O request alters the same address(es) and/or disk locations as the rebuild I/O request and, to ensure data integrity, allow the host I/O request to finish processing before the rebuild I/O request.

The discussions above describe both host and rebuild I/O requests as being queued by the RAID management system. In alternative embodiments, such queuing is not necessary. By way of example, a host computer or rebuild controller may send a signal or message to the RAID management system when it has an I/O request, and then transmit the I/O request for processing when it receives an acceptance or acknowledgment signal or message from the RAID management system.

Thus, improving host I/O performance and availability of a storage array during rebuild by prioritizing I/O requests has been described. Rebuild I/O requests are advantageously given priority over host I/O requests only when the storage array is close to permanently losing data. Otherwise, host I/O requests are given priority over rebuild I/O requests to increase the performance of the storage array in response to the host I/O requests without significantly increasing the chance of data loss.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
    identifying that a storage array is close to permanently losing data; and
    altering placement of input/output (I/O) requests in a queue in response to identifying that the storage array is close to permanently losing data, wherein placement in the queue of I/O requests for rebuilding at least a portion of the storage array is altered in order to increase priority with respect to host I/O requests.

2. A method as recited in claim 1, wherein the identifying comprises identifying that the storage array is close to permanently losing data when failure of one additional storage device of a plurality of storage devices in the storage array would result in permanent data loss in the storage array.

3. A method as recited in claim 1, wherein the storage array comprises a redundant array of independent disks (RAID) system.

4. A method as recited in claim 3, wherein:
    the RAID system includes a plurality of RAID levels;
    the identifying comprises identifying when at least one of the plurality of RAID levels is close to permanently losing data; and
    giving rebuild I/O requests priority over host I/O requests only for the at least one RAID level that is close to permanently losing data.

5. A method as recited in claim 4, wherein one of the plurality of RAID levels includes RAID level 6.

6. A method as recited in claim 1, further comprising giving host I/O requests priority over rebuild I/O requests if the storage array is not close to permanently losing data.

7. A method as recited in claim 1, further comprising:
placing both I/O requests for rebuilding at least the portion of the array and host I/O requests into a queue in the order they are received; and
processing the I/O requests for rebuilding and the host I/O requests from the queue in a first-in-first-out (FIFO) manner.

8. A method as recited in claim 1, further comprising:
allocating, among a plurality of resources in the storage array and a corresponding controller, more resource usage to the I/O requests for rebuilding than to the host I/O requests.

9. A method as recited in claim 1, further comprising preempting a host I/O request in favor of a rebuild I/O request.

10. A method as recited in claim 1, wherein how many failed disks in the storage array can be endured without permanently losing data varies based at least in part on a particular redundant array of independent disks (RAID) architecture level of the storage array.

11. One or more computer-readable media having stored thereon a computer program that, when executed by one or more processors of a computer, causes the one or more processors to perform acts including:
identifying that a storage array is close to permanently losing data; and
altering placement of input/output (I/O) requests in a queue in response to identifying that the storage array is close to permanently losing data, wherein placement in the queue of I/O requests for rebuilding at least a portion of the storage array is altered in order to increase priority with respect to host I/O requests.

12. One or more computer-readable media as recited in claim 11, wherein the identifying comprises identifying that the storage array is close to permanently losing data when failure of one additional storage device of a plurality of storage devices in the storage array would result in permanent data loss in the storage array.

13. One or more computer-readable media as recited in claim 11, further comprising:
allocating, among a plurality of resources in the storage array and a corresponding controller, more resource usage to the I/O requests for rebuilding than to the host I/O requests.

14. One or more computer-readable media as recited in claim 11, wherein how many failed disks in the storage array can be endured without permanently losing data varies based at least in part on a particular redundant array of independent disks (RAID) architecture level of the storage array.

15. An apparatus comprising:
a priority identifier to determine whether host input/output (I/O) requests or rebuild I/O requests for a storage array are to have priority; and
a request dispatcher, communicatively coupled to the priority identifier, to select host I/O requests and rebuild I/O requests for execution based at least in part on whether host I/O requests or rebuild I/O requests are to have priority;
a request queue structure into which the rebuild I/O requests and the host I/O requests are placed to await selection for execution by the request dispatcher; and
a queue controller, communicatively coupled to the request queue structure, configured to order requests in the queue structure so that host I/O requests are placed into the request queue structure below existing host I/O requests but above existing rebuild I/O requests when host I/O requests are to have priority.

16. An apparatus as recited in claim 15, wherein the storage array comprises a redundant array of independent disks (RAID) system.

17. An apparatus as recited in claim 15, wherein the request queue structure includes a plurality of queues.

18. An apparatus as recited in claim 15, further comprising:
a plurality of resources; and
wherein the request dispatcher is to limit the host I/O request usage of at least one of the plurality of resources if rebuild I/O requests are to have priority.

19. An apparatus as recited in claim 15, wherein the priority identifier is to determine that rebuild I/O requests are to have priority if failure of one additional storage device of a plurality of storage devices in the storage array would result in data loss in the storage array.

20. An apparatus as recited in claim 15, further comprising a request processor, communicatively coupled to the request dispatcher, to process I/O requests and preempt a host I/O request in favor of a rebuild I/O request.

* * * * *